July 25, 1944.　　　T. T. ROSS　　　2,354,279
FISHING SIGNAL
Filed Nov. 23, 1942　　2 Sheets-Sheet 1

Inventor
Timothy T. Ross

By Clarence A. O'Brien
and Harvey B. Jacobson
Attorneys

July 25, 1944.  T. T. ROSS  2,354,279
FISHING SIGNAL
Filed Nov. 23, 1942  2 Sheets-Sheet 2
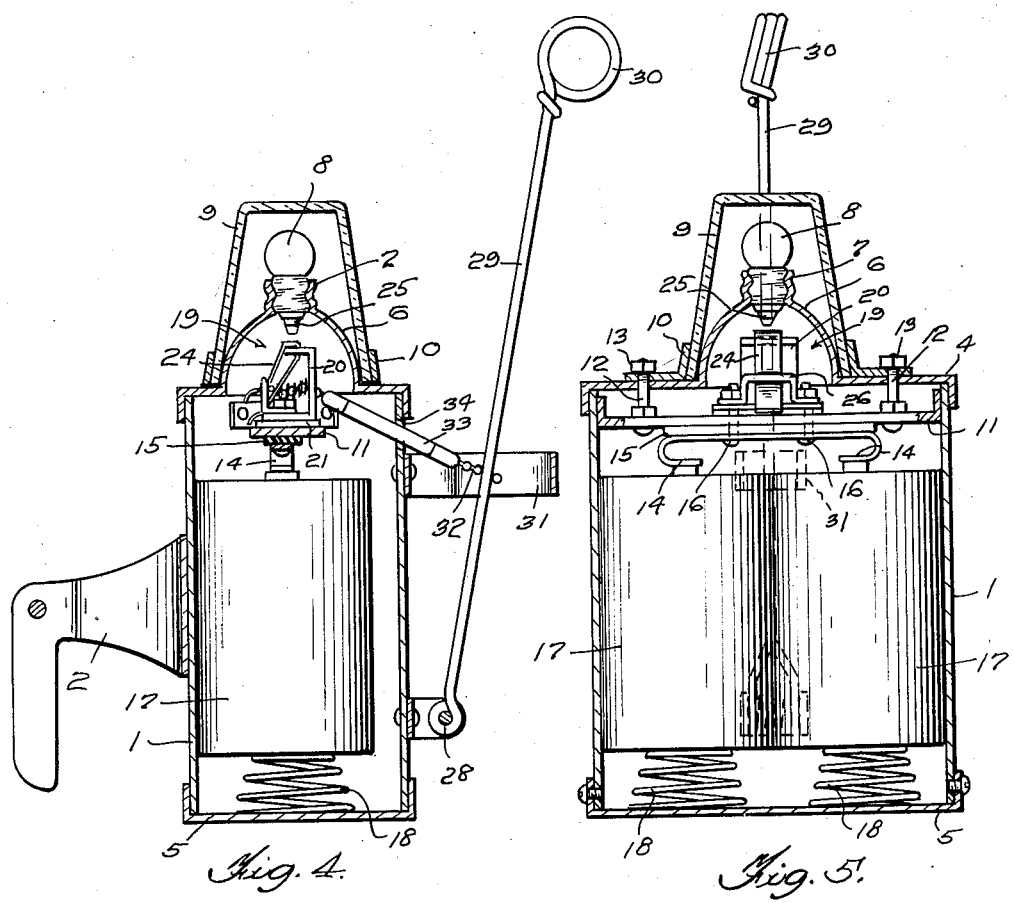
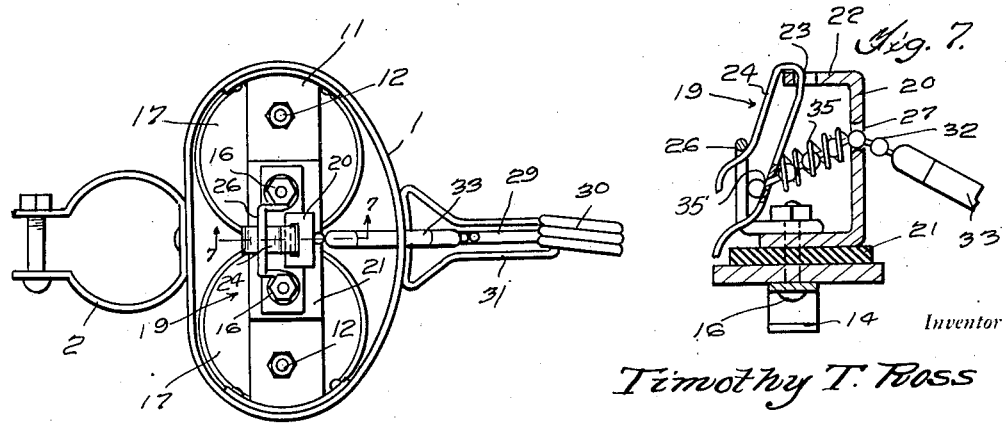
Inventor
Timothy T. Ross
By Clarence A. O'Brien
and Harvey B. Jacobson
Attorneys Patented July 25, 1944

2,354,279

UNITED STATES PATENT OFFICE 2,354,279

FISHING SIGNAL

Timothy T. Ross, Cleveland, Ohio

Application November 23, 1942, Serial No. 466,643

2 Claims. (Cl. 43—17)

The present invention relates to new and useful improvements in signals, particularly for still fishing at night, and has for its primary object to provide, in a manner as hereinafter set forth, novel means for automatically lighting an electric signal lamp when a bite or strike is had.

Another very important object of the invention is to provide an automatic signal of the aforementioned character comprising a lever operated switch of unique construction for controlling the electric lamp.

Other objects of the invention are to provide an automatic fishing signal of the character described which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a vertical sectional view, taken substantially on the line 4—4 of Figure 3.

Figure 5 is a vertical sectional view, taken substantially on the line 5—5 of Figure 1.

Figure 6 is a top plan view of the device with the cover, electric lamp, et cetera, removed.

Figure 7 is a view in vertical section through the switch, taken substantially on the line 7—7 of Figure 6.

Figure 2:
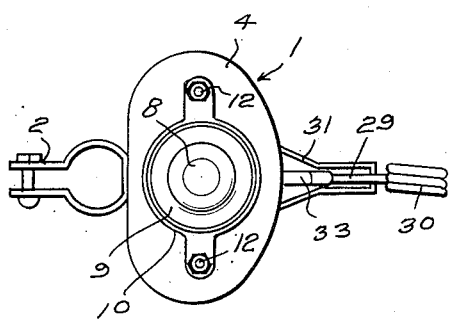
Figure 2 is a top plan view.

Referring now to the drawings in detail, it will be seen that the embodiment of the invention which has been illustrated comprises a case 1 of substantially the shape shown to advantage in Figures 2 and 6 of the drawings. The case 1 is provided, on the back thereof, with suitable means 2 for removably mounting the device on a support 3. The case 1 includes a removable top and bottom 4 and 5, respectively.

The top 4 of the case 1 comprises a dome 6 having formed integrally therewith a threaded neck constituting a socket 7 for the reception of an electric lamp 8. A transparent globe 9 encloses the lamp 8. The globe 9 is removably secured in position on the top 4 around the dome 6 by an annular clamp 10. A metallic bar 11 is secured transversely in the upper portion of the case 1. Upstanding bolts 12 on the bar 11 secure the top 4 and the clamp 10 in position. The bolts 12 are equipped with nuts 13.

A pair of integral, resilient contacts 14 are mounted beneath the bar 11 and electrically insulated therefrom, as at 15. Bolts 16 secure the contacts 14 in position. The case 1 is for the reception of a pair of batteries 17. Coil springs 18 electrically connect the positive poles of the batteries 17 to the contacts 14 and ground the negative poles of said batteries on the case 1.

Mounted on the bar 11 is a switch 19 for controlling the flow of current to the lamp 8 from the batteries 17. The switch 19 comprises a substantially U-shaped metallic bracket 20 which is mounted on the bar 11 with insulation 21 therebetween. The bolts 16 secure the bracket 20 in position and electrically connect same to the contacts 14. The horizontally projecting upper leg 22 of the bracket 20 has formed therein a slot 23. Loosely mounted for sliding and swinging movement on the free end portion of the bracket leg 22 and depending therefrom is a substantially U-shaped, resilient contact 24 which is engageable with the base contact 25 of the electric lamp 8. The contact 24 is operable in the slot 23 in the bracket 20. A substantially U-shaped wire guard 26 is also mounted on the bolts 16, in which guard the legs of the contact 24 are operable. The bight portion of the bracket 20 has formed therein an opening 27.

Pivotally mounted, as at 28, on the lower portion of the front of the case 1 for swinging movement in a vertical plane is a lever 29. At its free end, the lever 29 terminates in an eye or loop 30. The lever 29 is operable in a guide 31 which projects from the front of the case 1. The lever 29 is operatively connected, at an intermediate point, to the switch contact 24 by a beaded chain 32 which is operable in the opening 27 in the bracket 20. The chain 32 includes an insulating link or the like 33 which is operable in an opening 34 in the front of the case 1. A coil spring 35 encircles the inner portion of the chain 32 between the bracket 20 and the contact 24 for yieldingly urging said contact to open or inoperative position and for retracting the lever 29. The inner end of chain 32 passes through an opening 35' in contact 24.

Figure 1:
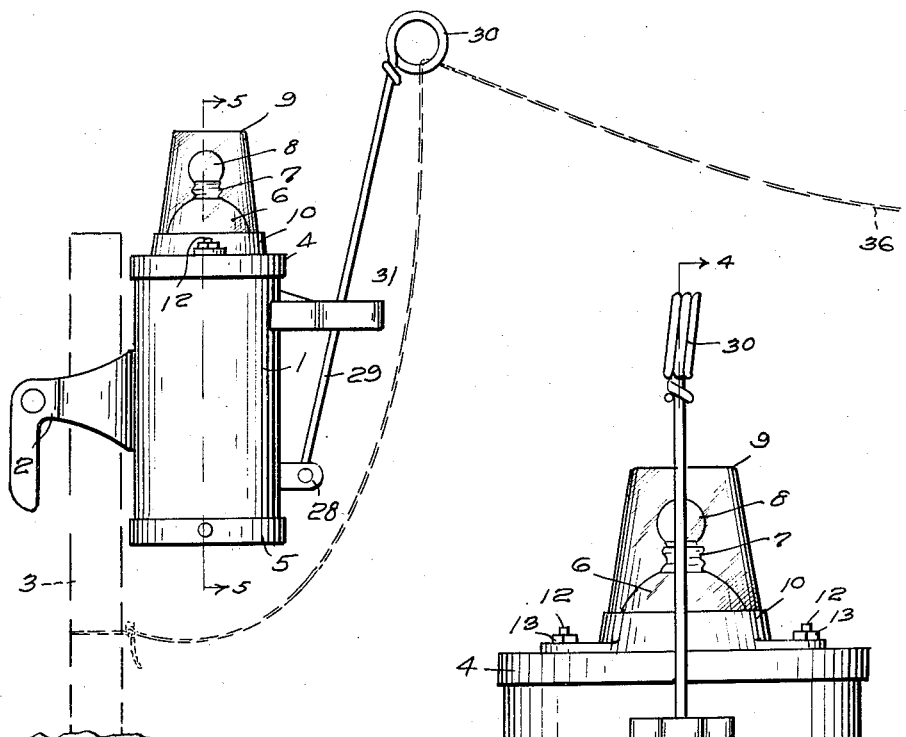
Figure 1 is a view in side elevation of a signal constructed in accordance with the present invention, showing the device in use.
Figure 3:
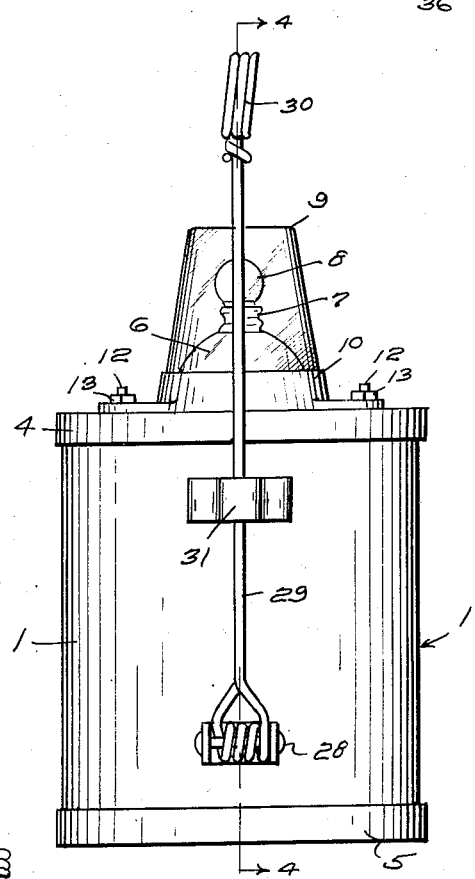
Figure 3 is a view in front elevation of the device.

It is thought that the operation of the device will be readily apparent from a consideration of the foregoing. Briefly, the fishing line 36 (see Fig. 1) is threaded through the eye 30 and anchored to the support 3 or to any other suitable object. When a fish bites and pulls on the line 36, the lever 29 is swung forwardly and downwardly for elevating the contact 24 in the slot 23 into engagement with the base contact 25 of the lamp 8, thus energizing said lamp. If the pull or strain is removed from the fishing line, the coil spring 35 disengages the contact 24 from the lamp contact 25, thus deenergizing the lamp. It will thus be seen that if the fishing line is subjected to intermittent jerks, the signal lamp will be caused to flash on and off. If, on the other hand, the fishing line is subjected to a more or less steady pull, the signal lamp will stay on. The construction, it will be observed, is also such that the various parts may be expeditiously removed for replacement when necessary.

It is believed that the many advantages of a fishing signal constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A fishing signal comprising a case for the reception of electric batteries, said case including a removable top and a removable bottom, an integral dome rising from the top, a threaded socket rising from said dome, an electric lamp mounted in said socket, a transparent globe enclosing the lamp and encircling the dome on the top, an annular clamp encircling the globe on the top, a bar mounted in the upper portion of the case, bolts on said bar securing the clamp and the top in position, switch controlled means on the bar for electrically connecting the lamp to the batteries, and means operable by a fishing line for actuating said switch controlled means for energizing the lamp.

2. A fishing signal comprising a case for the reception of electric batteries, an electric lamp mounted on the case, a metallic bar mounted on the case, resilient contacts mounted on the bar and insulated therefrom and engageable with the batteries, a switch mounted on the bar, said switch including a metallic bracket electrically connected to the contacts, said bracket being mounted on the bar and insulated therefrom, a substantially U-shaped guard mounted on the bracket, a substantially U-shaped, resilient contact mounted for sliding and swinging movement on the bracket and engageable with the base contact of the lamp, the legs of the second-named contact being operable in the guard, a lever, operable by a fishing line, pivotally mounted on the case, and means operatively connecting said lever to the second-named contact for engaging same with the lamp.

TIMOTHY T. ROSS.